United States Patent
Zhao et al.

(10) Patent No.: US 10,645,261 B2
(45) Date of Patent: May 5, 2020

(54) IMAGE SENSOR TERMINAL AND BUILDING MONITORING SYSTEM

(71) Applicant: Carrier Corporation, Farmington, CT (US)

(72) Inventors: Jianwei Zhao, Shanghai (CN); Benliang Li, Beijing (CN); Qiang Li, Shanghai (CN); Anning Qui, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 15/767,910

(22) PCT Filed: Oct. 4, 2016

(86) PCT No.: PCT/US2016/055250
§ 371 (c)(1),
(2) Date: Apr. 12, 2018

(87) PCT Pub. No.: WO2017/066035
PCT Pub. Date: Apr. 20, 2017

(65) Prior Publication Data
US 2018/0309909 A1    Oct. 25, 2018

(30) Foreign Application Priority Data
Oct. 15, 2015 (CN) .................... 2015 2 0795088 U

(51) Int. Cl.
*H04N 5/225* (2006.01)
*G02B 5/23* (2006.01)
(Continued)

(52) U.S. Cl.
CPC ............ *H04N 5/2252* (2013.01); *G02B 5/23* (2013.01); *G03B 11/00* (2013.01); *G03B 17/02* (2013.01); *H04N 5/2256* (2013.01); *H04N 7/181* (2013.01)

(58) Field of Classification Search
CPC .......... G02B 5/23; G03B 11/00; G03B 17/02; H04N 5/2252; H04N 5/2256; H04N 7/181;
(Continued)

(56) References Cited

U.S. PATENT DOCUMENTS 4,561,015 A * 12/1985 Korch ................. H04N 5/2254
348/240.99
4,990,287 A * 2/1991 Bennion .............. C07D 311/96
252/586
(Continued)

FOREIGN PATENT DOCUMENTS

| CN | 1423481 A | 6/2003 |
|---|---|---|
| CN | 200953594 Y | 9/2007 |

(Continued)

OTHER PUBLICATIONS

Abuarafah, Adnan Ghazi et al., "Real-time Crowd Monitoring using Infrared Thermal Video Sequences", Journal of American Science, 2012;8(3), pp. 134-140.
(Continued)

*Primary Examiner* — Chiawei Chen
(74) *Attorney, Agent, or Firm* — Cantor Colburn LLP

(57) ABSTRACT

An image sensor terminal and a building management system, and belongs to the field of building intelligent management technologies. The image sensor terminal includes an image sensor and a lens element, and further includes: a photosensitive filter and light-transmitting layer disposed at a light incoming side of the lens element; and the
(Continued)

image sensor terminal is further provided with a mounting portion for fixing the image sensor terminal into a building. A building management system uses a plurality of the image sensor terminals. Image information acquired by the image sensor terminal under strong light conditions is more accurate, and image information acquired under different ambient light density conditions is more consistent. The control of the building management system under different ambient light density conditions has better accuracy.

7 Claims, 2 Drawing Sheets

(51) Int. Cl.
    *G03B 11/00*     (2006.01)
    *G03B 17/02*     (2006.01)
    *H04N 7/18*     (2006.01)

(58) Field of Classification Search
    CPC ............ H04N 5/2251; G08B 13/19619; G08B 13/19632; G08B 13/19617
    See application file for complete search history.

(56) References Cited

U.S. PATENT DOCUMENTS

| | | | |
|---|---|---|---|
| 5,252,256 A * | 10/1993 | Tutt | G02F 1/3551 252/582 |
| 5,581,300 A | 12/1996 | Kim | |
| 5,614,990 A | 3/1997 | Bruce et al. | |
| 5,869,855 A | 2/1999 | Yoon et al. | |
| 6,963,437 B2 | 11/2005 | Bauer et al. | |
| 7,929,220 B2 | 4/2011 | Sayag | |
| 8,605,175 B2 | 12/2013 | Izuha et al. | |
| 8,847,135 B2 | 9/2014 | Izuha et al. | |
| 9,064,983 B2 | 6/2015 | Izuha et al. | |
| 10,114,342 B2 * | 10/2018 | Kim | G04G 21/08 |
| 2002/0012064 A1 * | 1/2002 | Yamaguchi | H04N 5/2254 348/362 |
| 2002/0086250 A1 * | 7/2002 | Katoh | G03C 1/12 430/574 |
| 2003/0103151 A1 | 6/2003 | Luo | |
| 2004/0047050 A1 * | 3/2004 | Bauer | H01L 27/14618 359/738 |
| 2007/0133983 A1 | 6/2007 | Traff | |
| 2008/0170187 A1 * | 7/2008 | Shimizu | C09B 67/0035 349/106 |
| 2009/0121301 A1 | 5/2009 | Chang | |
| 2009/0213208 A1 * | 8/2009 | Glatt | G03B 37/00 348/36 |
| 2010/0208068 A1 * | 8/2010 | Elsemore | A01M 31/002 348/143 |
| 2010/0323293 A1 * | 12/2010 | Fujita | G03F 7/028 430/270.1 |
| 2011/0141336 A1 | 6/2011 | Mittleman | |
| 2011/0242349 A1 * | 10/2011 | Izuha | H01L 27/14621 348/222.1 |
| 2011/0285881 A1 * | 11/2011 | Izuha | H04N 5/2254 348/279 |
| 2012/0107607 A1 * | 5/2012 | Takaki | C08J 7/047 428/336 |
| 2014/0327768 A1 * | 11/2014 | Marshall | H04N 7/183 348/143 |
| 2015/0124150 A1 * | 5/2015 | Hibino | B60R 11/04 348/335 |
| 2016/0277688 A1 * | 9/2016 | Gaskamp | H04N 5/332 |
| 2016/0286607 A1 * | 9/2016 | Mishra | G08B 19/005 |
| 2016/0344914 A1 * | 11/2016 | Um | G03B 9/02 |
| 2017/0371179 A1 * | 12/2017 | Scherlen | G02C 7/10 |
| 2018/0024359 A1 * | 1/2018 | Yoneyama | H04N 9/3194 345/9 |
| 2018/0164608 A1 * | 6/2018 | Schmeder | G02C 7/104 |
| 2018/0164613 A1 * | 6/2018 | Ye | G03B 17/02 |
| 2019/0258061 A1 * | 8/2019 | Solomon | G02B 27/0172 |

FOREIGN PATENT DOCUMENTS

| | | |
|---|---|---|
| DE | 102006003785 A1 | 7/2007 |
| EP | 2685310 A1 | 1/2014 |
| JP | S6449026 A | 2/1989 |

OTHER PUBLICATIONS

International Search Report and Written Opinion for application PCT/US2016/055250, dated Dec. 13, 2016, 11 pages.
VisionSystems Design, "Image Sensors: Smart Filter Increases Dynamic Range of Cameras" available atL https://www.vision-systems.com/articles/print/volume-17/issue-6/departments/technology-trends/image-sensors-smart-filter-increases-dynamic-range-of-cameras.html, Penwall Corporation, Jun. 1, 2012, 3 pages.

* cited by examiner (a)

(b)

IMAGE SENSOR TERMINAL AND BUILDING MONITORING SYSTEM

TECHNICAL FIELD

The utility model belongs to the field of building intelligent management technologies, and relates to an image sensor terminal and a building management system using the image sensor.

RELATED ART

In intelligent management of a building, it is necessary to dispose information acquisition terminals in various positions of the building to collect site status information, and it is common to use image sensor terminals to acquire at least video image information.

However, in various positions of the building, ambient light densities are inconsistent, and in different time periods, the ambient light densities change greatly; in this way, in a situation where the ambient light density of the image sensor terminal changes greatly, it is difficult for the image sensor terminal to capture clear image information, for example, in a situation where the ambient light density changes greatly, the image sensor terminal's analysis on the number of human beings in the captured image information is often inaccurate, and in the prior art, image information is also acquired more accurately often by relying on circuit processing capability of the image sensor; however, this often has certain limitations.

Therefore, the change of the ambient light density in the building easily results in that video image information obtained by the same image sensor terminal is inaccurate or results in that video image information obtained by different image sensor terminals is inaccurate, and when the building management system works based on the inaccurate video image information, it is easy to lead to unscientific and inaccurate control, for example, great problems may be brought about to the control over an air conditioning system, the control over an escape evacuation system, the control over an elevator system and so on.

SUMMARY

An objective of the utility model is to improve accuracy of image information acquired by an image sensor terminal under different ambient light density conditions.

Another objective of the utility model is to improve accuracy of the control of a building management system under different ambient light density conditions.

To achieve the aforementioned objectives or other objectives, the utility model provides the following technical solutions.

According to one aspect of the utility model, an image sensor terminal is provided, including an image sensor and a lens element, and further including: a photosensitive filter and light-transmitting layer disposed at a light incoming side of the lens element; and the image sensor terminal being further provided with a mounting portion for fixing the image sensor terminal into a building.

In the image sensor terminal of an embodiment, the photosensitive filter and light-transmitting layer includes a light-transmitting substrate and a photosensitive filter coating.

Specifically, the thickness of the photosensitive filter coating is 0.005 mm to 5 mm.

In the image sensor terminal of an embodiment, the thickness of the photosensitive filter and light-transmitting layer is 0.1 mm to 8 mm.

In the image sensor terminal of an embodiment, the image sensor terminal further includes:

a light density sensing component disposed between the lens element and the photosensitive filter and light-transmitting layer; and an auxiliary light source for enhancing ambient light of an environment where the image sensor terminal is located;

wherein the auxiliary light source is configured to be triggered and lit when light density received by the light density sensing component is lower than a predetermined value.

In the image sensor terminal of an embodiment, the mounting portion is provided with an interface port for connecting with extra-low voltage wiring in the building.

In the image sensor terminal of an embodiment, the image sensor terminal further includes: a Bluetooth module or a wifi module.

In the image sensor terminal of an embodiment, the image sensor terminal further includes an analysis processor, which receives at least image information from the image sensor and analyzes the image information to output, from an output end thereof, statistical information data about human beings in the image information.

According to another aspect of the utility model, a building management system is provided, which is provided with a plurality of the image sensor terminals described above, the image sensor terminals being coupled to a control center of the building management system.

The image sensor terminal of the utility model is provided with a photosensitive filter and light-transmitting layer, not only is image information acquired under strong light conditions more accurate, but also influences of different ambient light densities on the image sensor terminal are reduced, and photosensitive conditions of image sensors are relatively consistent, so that image information acquired can be more consistent. The building management system of the utility model, when performing processing and analysis based on the image information relatively more accurate and more consistent, can obtain more accurate and consistent results, so that accuracy of the control under different ambient light density conditions is better and is also more scientific.

BRIEF DESCRIPTION OF THE DRAWINGS

The foregoing and other objectives and advantages of the utility model will be more complete and clearer in the following detailed descriptions with reference to the accompanying drawings, wherein the same or similar elements are represented with the same reference numerals.

DETAILED DESCRIPTION

Figure 1:
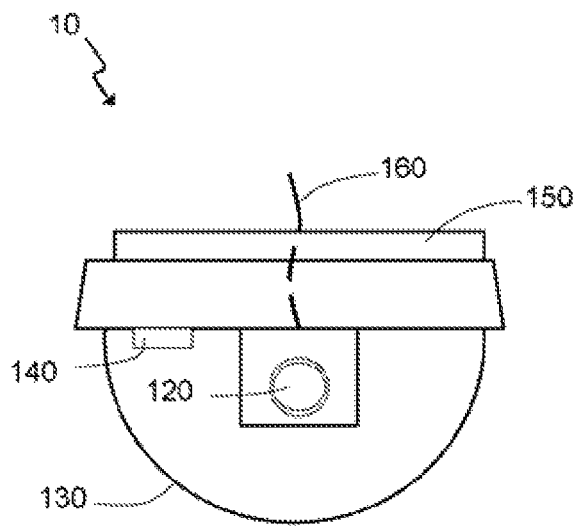
FIG. 1 is a schematic structural diagram of an image sensor terminal according to an embodiment of the utility model.

Some of many possible embodiments of the utility model are introduced below, aimed to provide a basic understanding about the utility model, instead of being aimed to confirm key or decisive elements of the utility model or limiting the protection scope of the utility model. It is easy to understand that persons of ordinary skill in the art can propose other mutually replaceable implementations according to the technical solutions of the utility model without changing the essential spirit of the utility model. Therefore, the following specific implementations and drawings are merely illustrative descriptions about the technical solutions of the utility model but should not be regarded as the entirety of the utility model or regarded as restrictions or limitations to the technical solutions of the utility model.

In the following description, for the sake of clear and simple description, not all the components shown in the drawings are described in detail. The drawings illustrate a plurality of components according to which persons of ordinary skill in the art can fully achieve the utility model, and for persons skilled in the art, operations of lots of components are familiar and evident.

FIG. 1 is a schematic structural diagram of an image sensor terminal according to an embodiment of the utility model. In this embodiment, description is given by taking that the image sensor terminal 10 is a spherical camera as an example. A light-transmitting spherical housing 130 of the image sensor terminal 10 is internally provided with an image sensor (not shown in FIG. 1) and a lens element 120, the light-transmitting spherical housing 130 is configured as a photosensitive filter and light-transmitting layer 130 in this embodiment, and the photosensitive filter and light-transmitting layer 130 may be formed by coating a photosensitive filter coating on the existing light-transmitting spherical housing, and may also be formed by doping various existing photosensitive materials into the material from which the light-transmitting spherical housing is made. When the image sensor terminal 10 is placed in different ambient light densities, the light transmittance of the photosensitive filter and light-transmitting layer 130 may change, thus making photosensitive conditions of the image sensor relatively consistent.

Figure 2:
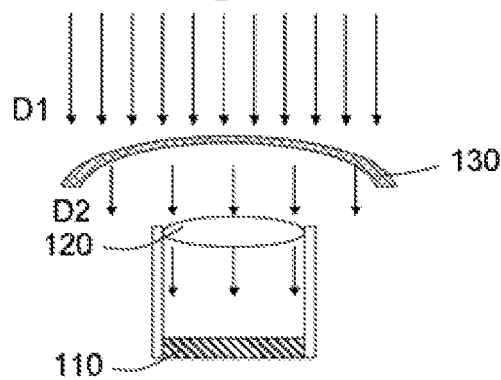
FIG. 2 shows the basic working principle of the image sensor terminal in the embodiment shown in FIG. 1.
Figure 2:
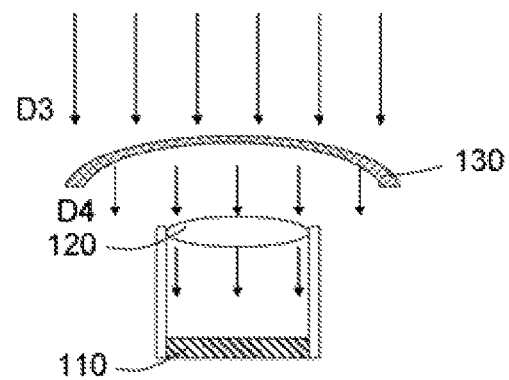

FIG. 2 shows the basic working principle of the image sensor terminal of the embodiment shown in FIG. 1. In combination with the illustrations in FIG. 1 and FIG. 2, it should be noted that the photosensitive filter and light-transmitting layer 130, the lens element 120 and the image sensor 110 are disposed sequentially according to the incidence direction of light, that is to say, the photosensitive filter and light-transmitting layer 130 is disposed at a light incoming side of the lens element 120, i.e., an outer side. The image sensor 110 may be, but is not limited to, a CMOS or CCD sensor or the like, and the specific type thereof is not restrictive; the optical element 120 may be various types of lenses. The thickness of the photosensitive filter and light-transmitting layer 130 may specifically range from 0.1 mm to 8 mm, for example, the thickness is 3 mm.

As shown in FIG. 2(a), when the ambient light density of the image sensor terminal 10 is strong, that is, light with the ambient light density of D1 is incident on the photosensitive filter and light-transmitting layer 130, the photosensitive filter and light-transmitting layer 130 may automatically discolor and produce a filter effect under a condition of the light density of D1; therefore, the light transmittance of the photosensitive filter and light-transmitting layer 130 is reduced, the light density of the light entering the optical element 120 changes into D2, the image sensor 110 conducts photosensitive imaging under a condition of the light density of D2, and the imaging is more accurate.

As shown in FIG. 2(b), when the ambient light density of the image sensor terminal 10 is relatively reduced, that is, light with the ambient light density of D3 is incident on the photosensitive filter and light-transmitting layer 130, the photosensitive filter and light-transmitting layer 130 may also automatically discolor and produce a filter effect under a condition of the light density of D3; however, compared with the situation in FIG. 2(a), the discoloration degree becomes small, and the filter effect is relatively poor, that is to say, the light transmittance of the photosensitive filter and light-transmitting layer 130 is reduced but is greater than that illustrated in FIG. 2(a). The light density of the light entering the optical element 120 correspondingly changes into D4, and the image sensor 110 conducts photosensitive imaging under a condition of the light density of D4. It can be determined that a light density difference between D4 and D2 is smaller than that between D1 and D3, that is, D4 and D2 are much closer; therefore, even if the ambient light density changes greatly, the image sensor 110 may conduct imaging under relatively consistent light densities, and imaging effects are more consistent; relatively accurate image information is easily obtained especially in a situation where the ambient light density is strong.

The photosensitive filter and light-transmitting layer 130 may be made of various existing photosensitive materials such as silver chloride, silver bromide or silver iodide, the material thereof specifically used is not limited, and the photosensitive materials may absorb light in a visible spectral region and automatically discolor after the photosensitive filter and light-transmitting layer 130 is irradiated by ultraviolet light or sunlight, and automatically return to the initial transparent state reversibly after illumination stops. Therefore, under different ambient light density conditions, the photosensitive filter and light-transmitting layer 130 may automatically acquire different light transmittances, and the lower the ambient light density is, the higher the light transmittance thereof is, for example, the light transmittance thereof is close to 100% in a situation where the ambient light density is very weak.

The photosensitive filter and light-transmitting layer 130 may be formed by photochromic glass in an embodiment. For example, photosensitive silver halide crystals are evenly distributed in the photochromic glass, and when the photochromic glass is irradiated by sunlight, Ag+ colloidal particles generated through decomposition of silver halide (AgCl, AgBr or AgI) has very strong light absorption, which may darken the glass; when there is substantially no sunlight irradiation, silver atoms and halogen atoms are bound again to produce colorless silver halide crystals to fade, and thus the photosensitive filter and light-transmitting layer 130 is also transparent. Under ultraviolet radiation, unstable electrons leave chloride ions and are bound to silver ions to form metal silver and absorb light, and the photochromic glass becomes dark in color. When the ultraviolet radiation weakens, moving electrons leave the silver atoms and return to chlorine atoms, and the photochromic glass gradually returns to the original light-transmitting state.

In another embodiment, the photosensitive filter and light-transmitting layer 130 may be formed by coating a photosensitive filter coating on a light-transmitting substrate, wherein the photosensitive filter coating may be the silver halide crystal described above, thus achieving an effect that the photosensitive filter and light-transmitting layer 130 automatically makes adjustment under different ambient light densities.

The photosensitive filter and light-transmitting layer 130 is disposed at an outer side of the optical element 120, and thus it is easy to improve the existing spherical camera to achieve the image sensor terminal 10 in the embodiment of the utility model, for example, the photosensitive filter and light-transmitting layer 130 may be formed by coating a photosensitive filter coating on a light-transmitting spherical housing. Certainly, in another alternative embodiment, the photosensitive filter coating may be coated at an inner side of the light-transmitting spherical housing. The thickness of the photosensitive filter coating is 0.005 mm to 5 mm, for example, 1 mm.

Still referring to FIG. 1, the image sensor terminal 10 is further provided with a mounting portion 150, wherein the mounting portion 150 may be a structure such as a mounting base, adapted to be used to fix the image sensor terminal 10 to a certain position in a building, and used to form an image information collection terminal of a building management system.

Still referring to FIG. 1, the image sensor terminal 10 is further provided with a light density sensing component 140 disposed between the lens element 120 and the photosensitive filter and light-transmitting layer 130, which may be used to sense the light density D2 or D4 as shown in FIG. 2; when the light density D2 or D4 is lower than a predetermined value or a predetermined range, it indicates that the ambient light density is too weak, and the image sensor terminal 10 may send an instruction to a corresponding auxiliary light source (not shown) according to a feedback result of the light density sensing component 140, thus triggering and lighting up the auxiliary light source to enhance the ambient light. Therefore, under weak ambient light conditions, accurate image information may also be obtained.

In an embodiment, the image sensor terminal 10 may further include an analysis processor (not shown), which receives at least image information collected by the image sensor 110 and analyzes the image information to output, from an output end 160 thereof, statistical information data about human beings in the image information. It should be noted that the analysis processing includes, but is not limited to, crowding degree estimation, personnel detection and human flow estimation, the statistical information data about human beings may be various digital data, and thus the data capacity is very small relative to the image information, which, when being transmitted to a control center of the building management system, on one hand, has low requirements on data transmission bandwidth (even a wireless communication transmission mode may be adopted for transmission), and on the other hand, is conducive to fully protecting personnel privacy because the image information involving privacy is not transmitted.

In an embodiment, the image sensor terminal 10 further includes a Bluetooth module or a wifi module (not shown), so that the output statistical information data about human beings can be transmitted in a Bluetooth transmission manner or a wifi transmission manner, and even the image sensor terminal 10 in the building can be driven or system-upgraded remotely in a Bluetooth transmission manner or a wifi transmission manner; therefore, the management on the image sensor terminal 10 is simple and convenient.

In an embodiment, the mounting portion 150 is provided with an interface, which may connect with extra-low voltage (ELV) wiring in the building, thereby reducing additional corresponding wiring for the image sensor terminal 10, and the wiring thereof during application in the building application system may not increase.

Figure 3:
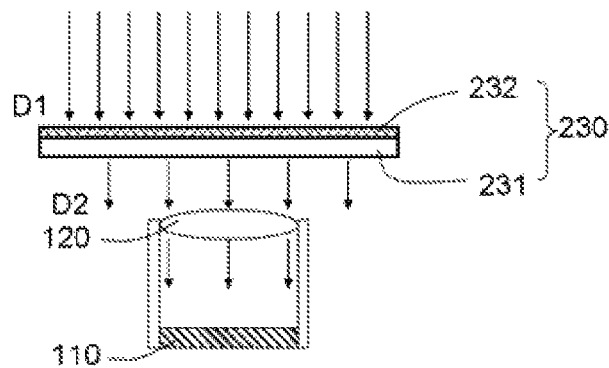
FIG. 3 is a schematic diagram of the working principle of an image sensor terminal according to another embodiment of the utility model.

It should be noted that the image sensor terminal 10 is not limited to the spherical camera illustrated in FIG. 1, for example, it may also be a gun camera. When the image sensor terminal 10 is a gun camera, a photosensitive filter and light-transmitting layer 230 may be disposed at an outer side of a lens of the gun camera. FIG. 3 is a schematic diagram of the working principle of an image sensor terminal according to another embodiment of the utility model; in this embodiment, the image sensor terminal is formed by improving the existing gun camera, and the photosensitive filter and light-transmitting layer 230, the lens element 120 and the image sensor 110 are disposed sequentially in the incidence direction of light. The photosensitive filter and light-transmitting layer 230 includes a planar light-transmitting substrate 231 and a photosensitive filter coating 232, wherein the photosensitive filter coating 232 is coated on the light-transmitting substrate 231, and the light-transmitting substrate 231 may be a glass substrate. The photosensitive filter coating 232 may specifically be formed through silver halide coating or the like, and under a stronger external light density condition, the photosensitive filter and light-transmitting layer 230 may also automatically discolor and produce a filter effect under a condition of a light density of D1, making the light density of the light entering the optical element 120 become D2.

Figure 4:
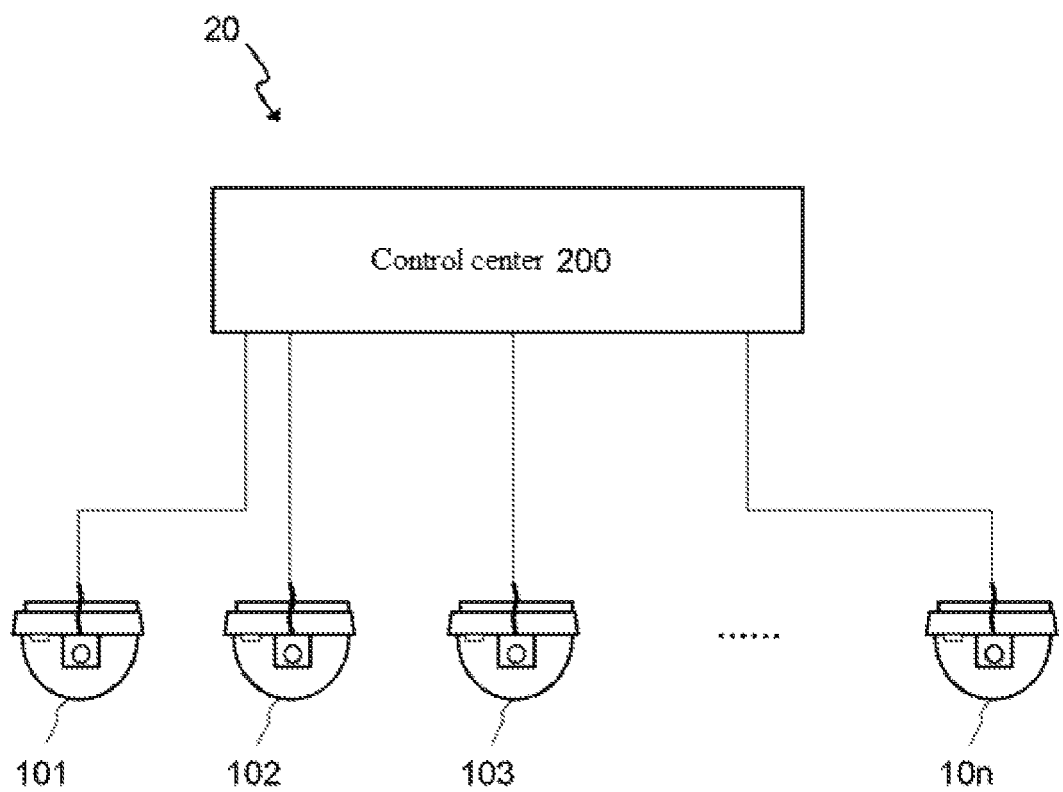
FIG. 4 is a schematic diagram of basic composition of a building management system according to an embodiment of the utility model.

FIG. 4 is a schematic diagram of basic composition of a building management system according to an embodiment of the utility model. In this embodiment, the building management system 20 uses the image sensor terminal 10 similar to that in the embodiment as shown in FIG. 1, exemplarily, n image sensor terminals 101, 102, 103 to 10n are mounted in various positions of a building, wherein n is an integer greater than 2, and the number and specific mounting positions of the image sensor terminals 10 are not limited. The n image sensor terminals 101, 102, 103 to 10n are coupled to a control center 200 of the building management system, so that acquired image information can be transmitted to the control center 200 directly or after processing.

The plurality of image sensor terminals 10 is disposed in different positions of the building respectively, thus having different ambient light density conditions, and the same image sensor terminal 10 has different ambient light density conditions in different time periods. By setting a photosensitive filter and light-transmitting layer 130, not only is image information acquired under strong light conditions more accurate, but also influences of different ambient light densities on the image sensor terminal 10 are reduced, and photosensitive conditions of image sensors are relatively consistent, so that image information acquired by them can be more consistent. The control center 200, when performing processing and analysis based on the image information relatively more accurate and more consistent, can obtain more accurate and consistent results, so that accuracy of the control under different ambient light density conditions is better and is also more scientific.

Exemplarily, different image information is acquired under different ambient light conditions based on the existing different image sensor terminals, when the image information is processed to be used to intelligently control the building, for example, the image information is processed to obtain information about the number of human beings, even if the actual number of human beings is the same, the error of the information about the number of human beings obtained tends to be great when the image information acquired under different ambient light conditions is processed. However, based on the different image sensor terminals 10 in the above embodiments, even if different image information is acquired under different ambient light conditions, as photosensitive conditions of the acquired image information are relatively more consistent (the effect of the photosensitive filter and light-transmitting layer), in the case of the same actual number of human beings, the error of the information about the number of human beings obtained may be reduced when the image information acquired under different ambient light conditions is processed.

Moreover, the image sensor terminal 10 used in the building management system is easily formed by improving the existing image sensor terminal, and has a low manufacturing cost.

The examples described above mainly describe the image sensor terminal and the building management system in the utility model. Although only some implementation manners of the utility model are described, persons of ordinary skill in the art should understand that, the utility model may be implemented in many other manners without departing from the principle and scope of the utility model. Therefore, the examples and implementations illustrated are construed as schematic rather than restrictive, and the utility model may cover various modifications and replacements without departing from the spirit and scope of the utility model defined by the appended claims.

The invention claimed is:

1. An image sensor terminal, comprising an image sensor and a lens element, and further comprising:
   a photosensitive filter and light-transmitting layer disposed at a light incoming side of the lens element; and
   the image sensor terminal being further provided with a mounting portion for fixing the image sensor terminal into a building;
   wherein the photosensitive filter and light-transmitting layer is configured to pass a first light density in response to a first ambient light density and pass a second light density in response to a second ambient light density, the first ambient light density greater than the second ambient light density, a difference between the first ambient light density and the second ambient light density being greater then a difference between the first light density and the second light density;
   wherein the image sensor terminal further comprises:
   a light density sensing component disposed between the lens element and the photosensitive filter and light-transmitting layer; and
   an auxiliary light source for enhancing ambient light of an environment where the image sensor terminal is located;
   wherein the auxiliary light source is configured to be triggered and lit when light density received by the light density sensing component is lower than a predetermined value;
   an analysis processor, which at least receives image information from the image sensor and analyzes the image information to output, from an output end thereof, statistical information data about human beings in the image information.

2. The image sensor terminal according to claim 1, wherein the photosensitive filter and light-transmitting layer comprises a light-transmitting substrate and a photosensitive filter coating.

3. The image sensor terminal according to claim 2, wherein the thickness of the photosensitive filter coating is 0.005 mm to 5 mm.

4. The image sensor terminal according to claim 1, wherein the thickness of the photosensitive filter and light-transmitting layer is 0.1 mm to 8 mm.

5. The image sensor terminal according to claim 1, wherein the mounting portion is provided with an interface port for connecting with extra-low voltage wiring in the building.

6. The image sensor terminal according to claim 1, wherein the image sensor terminal further comprises: a Bluetooth module or a wifi module.

7. A building management system, provided with a plurality of the image sensor terminals according to claim 1, the image sensor terminals being coupled to a control center of the building management system.

* * * * *